(No Model.) 3 Sheets—Sheet 1.

J. L. BOGERT.
VALVE FOR ENGINES.

No. 325,488. Patented Sept. 1, 1885.

Witnesses
Chas. H. Smith
J. Staib

Inventor
John L. Bogert
for Lemuel W. Serrell
Atty

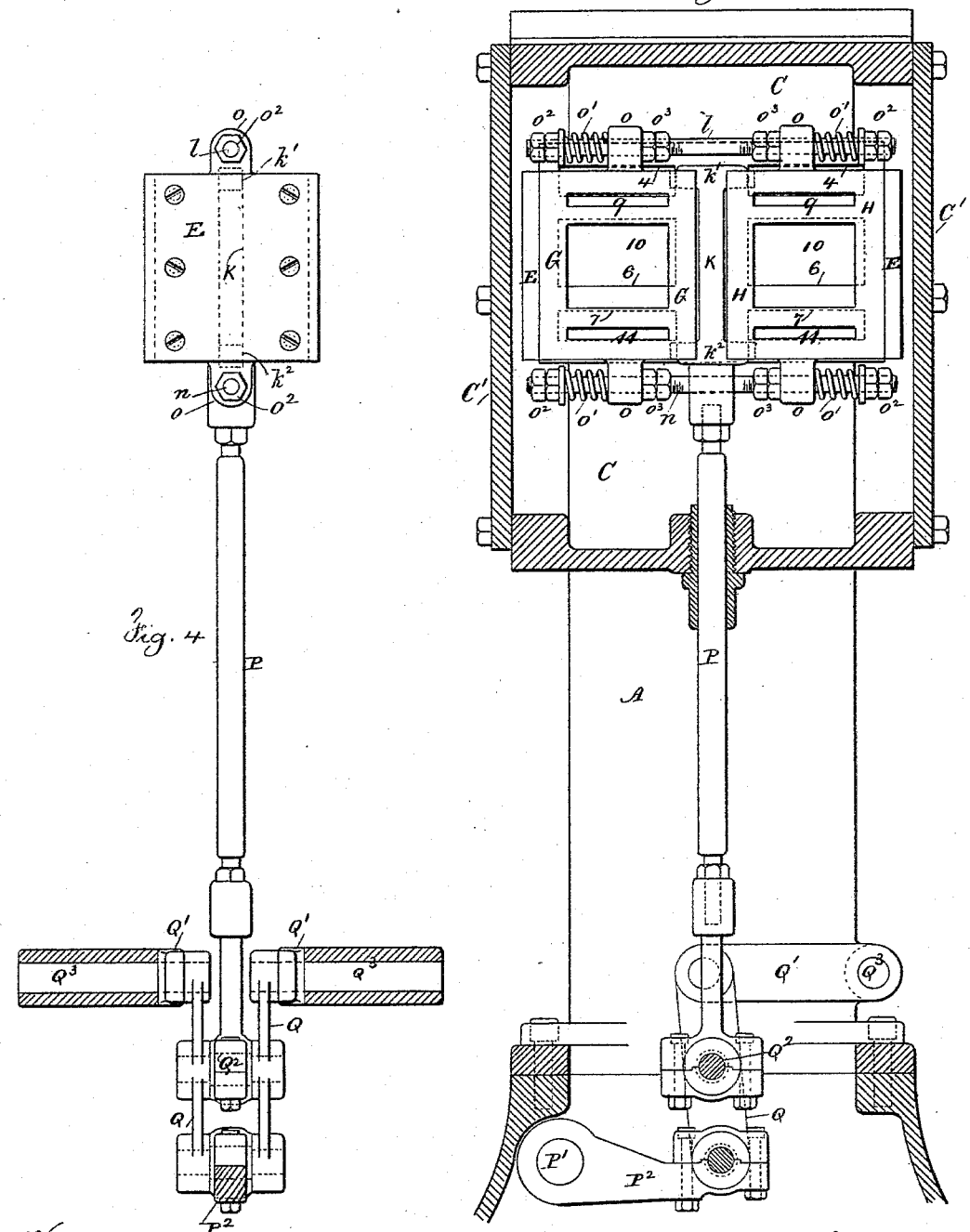

(No Model.) 3 Sheets—Sheet 3.
J. L. BOGERT.
VALVE FOR ENGINES.

No. 325,488. Patented Sept. 1, 1885.

Witnesses
Chas H Smith
J. Staib

Inventor
John L. Bogert.
per Lemuel W. Serrell
atty.

UNITED STATES PATENT OFFICE.

JOHN L. BOGERT, OF FLUSHING, NEW YORK.

VALVE FOR ENGINES.

SPECIFICATION forming part of Letters Patent No. 325,488, dated September 1, 1885.

Application filed January 31, 1885. (No model.)

*To all whom it may concern:*

Be it known that I, JOHN L. BOGERT, of Flushing, in the county of Queens and State of New York, have invented an Improvement in Valves for Engines, of which the following is a specification.

This improvement is especially intended for twin-cylinder single-acting engines; but it may be used for single-cylinder double-acting engines. The valves are made in two parts. Each part is like a wedge, and it slides between converging faces, in which are the steam and exhaust ports, and the two wedges are drawn toward each other by a yielding device, which causes them to take proper bearings upon the valve-seats, and in case of water of condensation accumulating in the cylinder, when the engine is started, the valve may be forced by the same off its seat, the water escapes, and the springs return the valve to its seat. The valve is balanced by the steam passing into recesses that correspond in size to the ports to which they are opposite, so that there will be a corresponding action of the live steam and the exhaust at both faces of the wedge-shaped valves.

Figure 1:
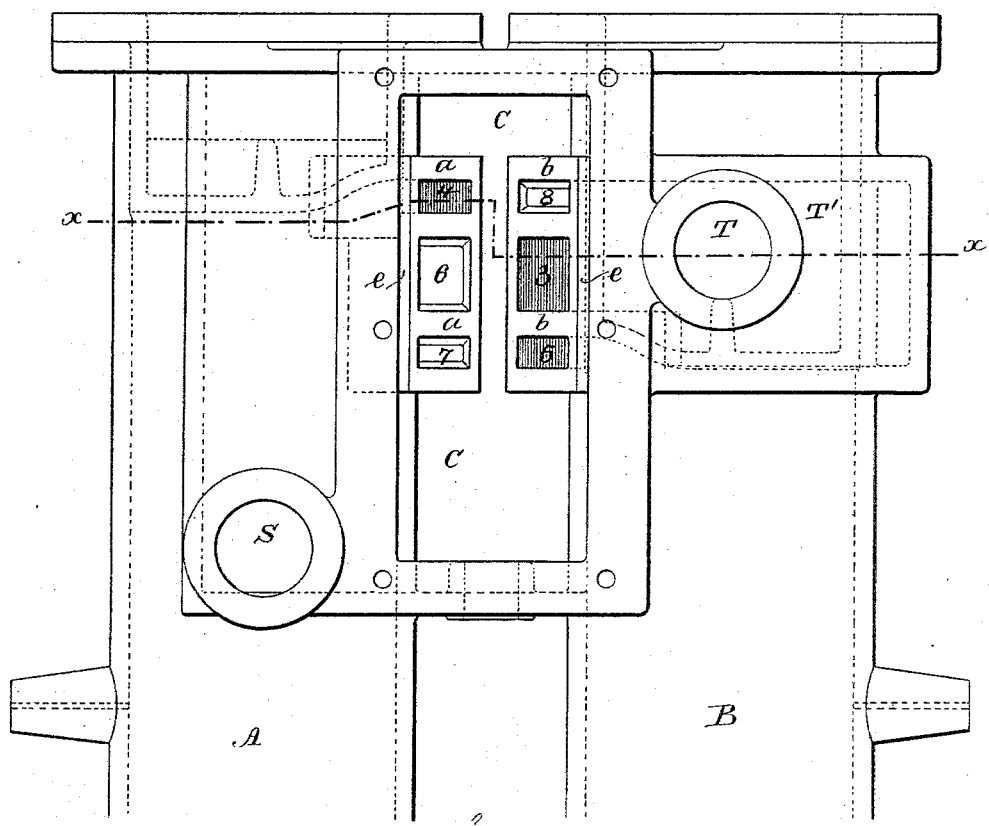
Figure 2:
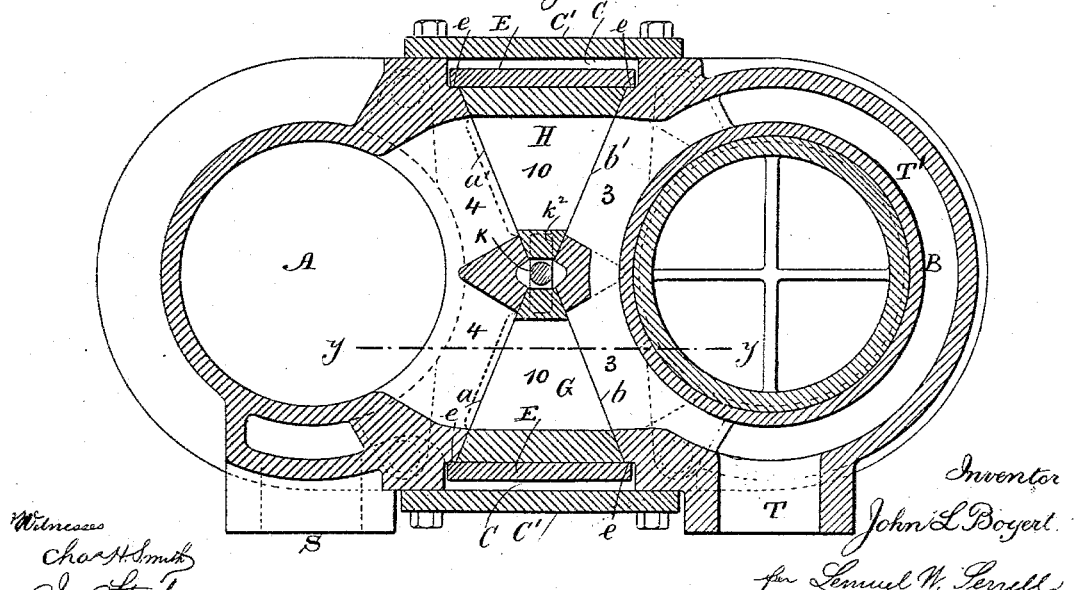
Figure 6:
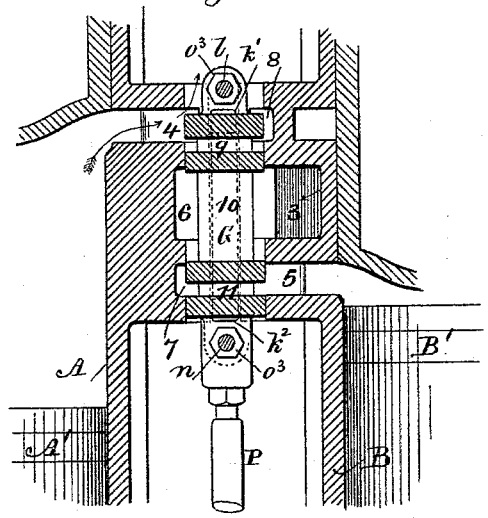
Figure 5:
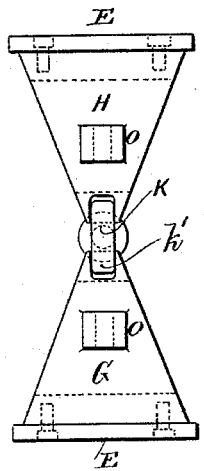

In the drawings, Figure 1 is an elevation of the twin cylinders and valve-seats, the cap of the valve-case being removed. Fig. 2 is a sectional plan of the parts at the line $x\ x$. Fig. 3 is a vertical section through the steam-chest, the valves being in elevation. Fig. 4 is an elevation of the guide, valve-rod, and valve detached. Fig. 5 is a plan view of the valves with the springs and rods removed, and Fig. 6 is a section at the line $y\ y$, Fig. 2.

The cylinders A B are adjacent to each other, and between them is the steam or exhaust chest C, with the covers C′.

Upon the adjacent portions of the cylinders there are the valve-seats $a\ a'\ b\ b'$. These converge, so that the surfaces $a\ a'$ form inclined planes opposite to the inclined planes $b\ b'$. In these valve-seats there are the steam-ports leading into the respective cylinders, and the steam is supplied and exhausted, as hereinafter described.

The valves are each in the form of a wedge, and the angle of one face to the other corresponds with the angles of the valve-seats to each other. Each valve is preferably provided with a plate, E, bolted to its broadest end, which plate rests at its edges upon the guide edges or offsets $e$ at the sides of the valve-seats.

The valves G H are placed with their narrowest edges toward each other, and between them is the valve-stem K, with top and bottom T-heads, $k'\ k^2$, entering recesses in the angles of the valves. These T-heads serve to move the valves endwise between the valve-seats.

In order to draw the wedge-shaped valves toward each other, I make use of the rods $l\ n$, passing through lugs $o$ upon the respective top and bottom surfaces of the valves, and there are springs $o'$, that surround the outer ends of these rods $l\ n$, and nuts $o^2$, that cause the springs to press upon the lugs to move the valves toward each other. The set-nuts $o^3$ prevent the springs forcing the valves too far toward each other, and thereby the pressure of the valves upon their seats is regulated. If, now, the engine-cylinder should be obstructed by water of condensation, the pressure of the same upon the valve-face will cause the wedge-shaped valve to move outwardly against the action of the springs, and the water will escape between the valve and its seat, and the springs will return the valve to place.

I have shown the rod $n$ as passing through a hole in the valve-stem, and at P is the valve-rod that receives end motion from any desired source. A convenient device is the rock-shaft P′, driven by an eccentric, the arm P², and parallel-motion links Q Q′, to the center bolt, Q², of which the lower end of the valve-rod is connected. The pivots Q³ of the links Q′ are in stationary bearings, and the valve-rod receives a rectilinear movement.

The devices thus far described may be used with any available arrangement of steam and exhaust ports. Where but a single cylinder is used, one valve may be employed to admit steam to the two ports leading to the ends of the cylinder, the ports being arranged as in the well-known D or B slide-valve. I have shown the ports as specially adapted to the twin-cylinder single-acting engine.

The steam-exhaust pipe S opens into a chamber that connects at top and bottom by lateral passages with the valve-chamber, and the steam is introduced by a pipe, T, into a jacket, T', that surrounds the cylinder B. In this construction, 3 3 are the steam-supply ports, 4 4 the ports leading into the cylinder A, and 5 the ports leading into the cylinder B. The ports 5 are below the steam-ports 3, and the ports 4 are above said steam-ports 3. In the valve-seats $a\ a'$ there are recesses 6, that are of the same size and directly opposite to the steam-ports 3, and recesses 7, that are directly opposite to and of the same size as the ports 5, and in the valve-seats $b\ b'$ there are recesses 8, directly opposite to and of the same size as the ports 4.

The two parts of the valve are made with openings 9 10 11, that go directly across them.

Upon reference to Fig. 6 the action of this valve will be apparent.

The length of the valve and the positions of the ports are usually such that the exhaust from one cylinder will open slightly in advance of the admission of steam into the other cylinder, and the supply of steam will be cut off to allow the steam to expand; and the vapors remaining in the exhausting-cylinder will be confined and slightly compressed by the piston as it reaches the end of the stroke.

In the position of Fig. 6 the pistons B' and A' are at the ends of the strokes and the cranks just turning the centers. The lead of the eccentric is such that the exhaust 4 has just been opened and the steam is escaping from the cylinder A. The further downward movement of the valve admits steam to pass from 3 into 10, and thence by 5 into B, driving the piston B' down. When the exhaust 4 is entirely open, the steam-port 5 is also open, and the angular advance of the eccentric is such that the valve commences to rise and shuts off the supply of steam to 5, and closes the exhaust 4 before the piston A' has completed its upstrokes and the piston B' its downstroke, and just as the stroke is completed the lower edge of the valve uncovers the port 5, allowing steam to exhaust from B, and immediately thereafter the upper edge of the port 10 in the valve arrives at the port 4 and allows steam to pass from 3 by 10 into the port 4, and the piston A' is driven down as the piston B' rises. The valve descends to shut off the inlet of steam to 4, so that the steam in A acts expansively, and the port 5 is closed to confine the exhausting vapors in B', and the valve again reaches the position shown in Fig. 5 as the piston B' terminates its upstroke and the piston A' its downstroke.

In all these movements the steam and exhaust pressures upon opposite faces of the wedge-shaped valve-sections are balanced, because the steam-pressure in the recess 6 is equal to the steam-pressure in the port 3, and the steam or exhaust in the port 5 has free access to the recess 7 through the opening 11; hence, as this recess 7 is of the same size as the port 5, the pressure at opposite sides of the valve is balanced. The same is true in regard to the recess 8, in which the pressure of steam or exhaust acts freely to balance the pressure or exhaust in the port 4. It will be seen that the cross-openings 9 and 11 are simply useful in allowing the steam to cross over and become a balancing pressure in the opposite recess, and these openings, being narrower than the metal at either side of the steam or exhaust ports, cannot allow steam to escape from the port 3 or the recess 6 to either of the adjacent ports; hence the only duty of these cross-ports 9 and 11 is to insure the balanced action of the valve, as before described.

It is to be understood that the exhaust-steam passes from the chamber C above and below the valve G and H to the exhaust-pipe S, and that this valve will operate if the passage 3 is used as an exhaust and the live steam admitted into the chamber C by the pipe S; but I prefer the arrangement shown.

I claim as my invention—

1. The combination of two wedge-shaped valve-sections, having their narrowest edges opposite to each other, with two converging valve-seats, steam and exhaust ports through the valves and seats, respectively, a valve-stem between the valves, and mechanism, substantially as specified, for giving motion to the valves and valve-stem, and for retaining the valve-sections in their proper relative positions, substantially as set forth.

2. The valve-sections G H, each in the shape of a wedge, in combination with the rods $l\ n$, passing through lugs on the valve-sections, the springs, and the nuts $o^2\ o^3$, substantially as set forth.

3. The valve-sections, each in the shape of a wedge, in combination with the actuating-rod placed between the sections, and having T-heads to pass into recesses in the respective valve-sections, substantially as set forth.

4. The wedge-shaped valve-sections having their narrowest edges opposite to each other, and having the openings 9, 10, and 11, in combination with the valve-seats $a\ a'\ b\ b'$ at an inclination to each other, and the ports 4 and 5, opening into the cylinders A B, and the recesses 6, 7, and 8, substantially as set forth.

5. The wedge-shaped valve-sections having openings in them, in combination with the valve-seats having ports for the admission of steam and for the exhaust, and recesses opposite to the respective ports for balancing the pressure upon the opposite sides of the valve, substantially as set forth.

6. The valve-seats that converge toward each other, in combination with wedge-shaped valve-sections introduced between such seats, and yielding mechanism for drawing the valve-sections toward each other and pressing them upon the seats, substantially as set forth.

7. The combination, with the valves having their narrowest ends opposite to each other, and having openings through them, of two cylinders, with valve-seats facing each other, and between which seats the valves are introduced and operated, substantially as set forth.

8. The combination, with the wedge-shaped valve-sections having openings through them, of two cylinders having valve-seats facing each other, and ports leading to such cylinders, the port for one cylinder being near one end of the valve, and for the other cylinder near the other end of the valve, substantially as set forth.

Signed by me this 27th day of January, A. D. 1885.

JOHN L. BOGERT.

Witnesses:
LEMUEL W. SERRELL,
WILLIAM G. MOTT.